July 7, 1925.

T. M. NORTON 1,544,927

SHOCK ABSORBING DEVICE FOR AUTOMOBILES

Filed July 14, 1924

Inventor
Truman Morse Norton
by Littlestinhaughte
Attys.

Patented July 7, 1925.

1,544,927

UNITED STATES PATENT OFFICE.

TRUMAN MORSE NORTON, OF HAMILTON, ONTARIO, CANADA.

SHOCK-ABSORBING DEVICE FOR AUTOMOBILES.

Application filed July 14, 1924. Serial No. 725,998.

*To all whom it may concern:*

Be it known that I, TRUMAN MORSE NORTON, a citizen of the United States of America, and a resident of the city of Hamilton, county of Wentworth, Province of Ontario, Dominion of Canada, have invented certain new and useful Improvements in Shock-Absorbing Devices for Automobiles, of which the following is the specification.

My invention relates to improvements in shock absorbing devices for automobiles and the object of the invention is to utilize the resiliency of the bumper, as ordinarily used on automobiles for shock absorbing purposes. Other objects will appear in the course of the following specification.

My invention consists essentially of the provision of connecting means between the resilient bumper, as ordinarily used on an automobile, and the axle whereby the bumper functions as a shock absorber, all as hereinafter more particularly described and illustrated in the accompanying drawings in which:—

In the drawings, like characters of reference indicate corresponding parts in the different views.

Figure 1:
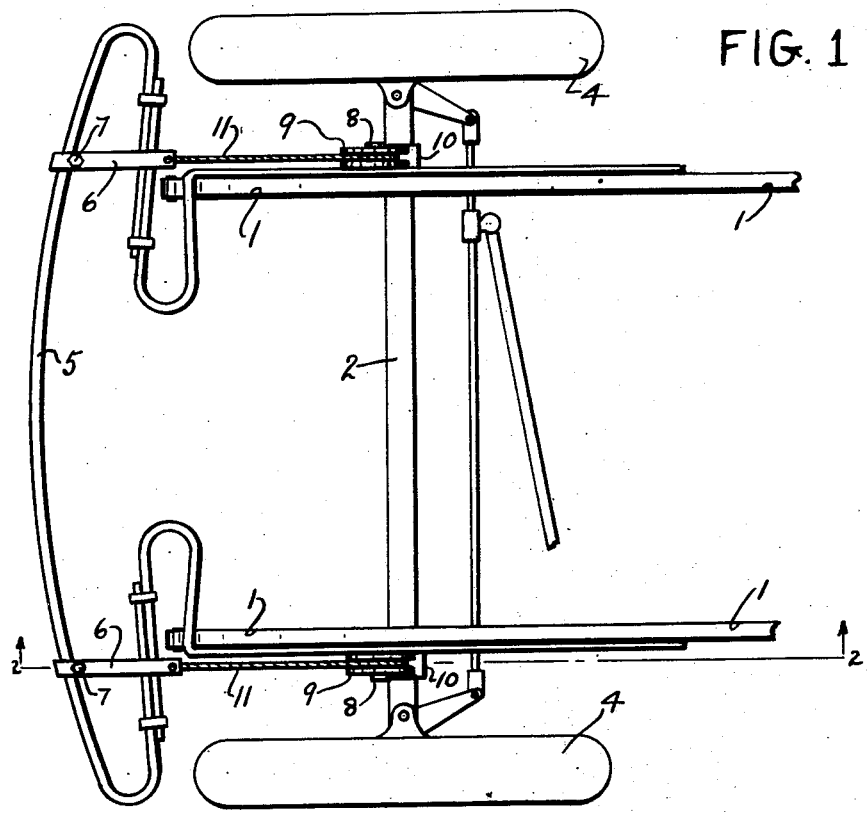
Fig. 1 is a diagrammatic plan view of the front portion of an automobile, showing my invention applied thereto.
Figure 2:
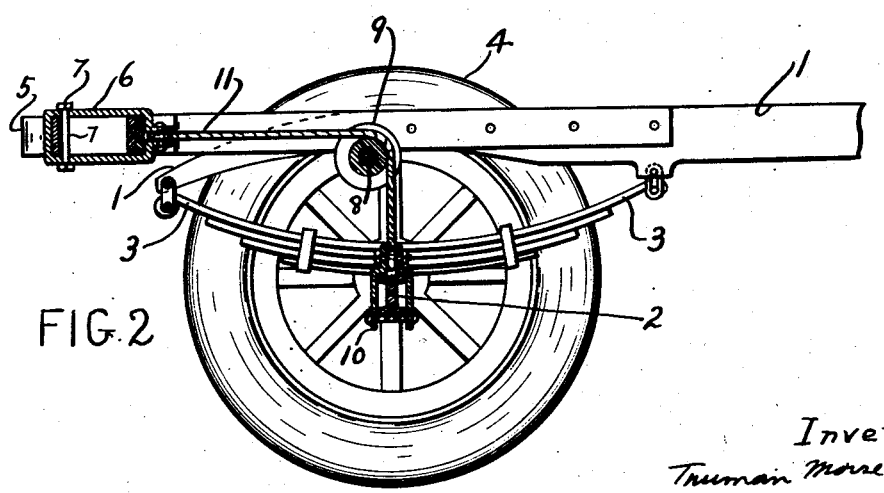
Fig. 2 is a section taken on the line 2—2 of Fig. 1 looking in the direction of the arrows.

In the embodiment of my invention illustrated, 1 indicates the side members of the chassis frame, 2 being the front axle, 3 the front springs and 4 the front wheels.

A resilient bumper 5 of the ordinary type is mounted upon the chassis frame members 1 and is disposed transversely of the automobile after the usual manner.

Brackets 6 are mounted upon the bumper 5 adjacent to each end thereof, these brackets being secured against the front member of the bumper 5 by the bolts 7. The rear portions of the bumper are freely slidable within the brackets 6.

Mounted upon the chassis frame at each side thereof and above the axle is a pin 8 upon each of which is rotatably mounted a grooved roller 9.

Secured upon the front axle adjacent to each end thereof and below each guide roller 9 is a bracket 10.

A flexible cable 11 connects each bracket 6 to the corresponding bracket 10 and passes freely over the corresponding grooved guide roller 9.

In mounting the device upon a vehicle it is to be understood that the cables 11 are so disposed that they are under an initial tension when the chassis frame and axle are in their normal positions relative to each other so that when the chassis and axle move towards each other these cables do not become slack but are held taut at all times with the result that the shock absorbing action of the resilient bumper is smooth and gradual and without a sudden jar as would be the case if the cables 11 were permitted to become slack.

In the form illustrated this is provided for by arranging the cables 11 so that the bumper 5 is held under an initial compression when the chassis and axle are in their normal relative positions although other well known ways of taking up the slack in the cables could be used.

The construction and operation of my invention is as follows.

From the foregoing description taken in conjunction with the accompanying drawings it will be apparent that the flexible cable 11 constitutes connecting means between the resilient bumper 5 and the axle 2 and that the guide rollers 9 constitute means carried by the chassis frame above the axle 2 for supporting this cable intermediately of its length.

During the operation of the automobile, whenever there is relative movement between the axle 2 and the chassis frame 1, this movement will be transmitted by the flexible cables 11 to the resilient bumper 5 and absorbed thereby and in this way the resiliency of the bumper 5 will be utilized for shock absorbing purposes.

From the foregoing it will be evident that by the use of my invention the ordinary resilient bumpers, as now used on automobiles, may be made to serve a double purpose and to function as shock absorbers, thus, enabling special shock absorbers to be dispensed with and reducing the cost to motorists.

While I have illustrated the application of my invention to the front end of an automobile it will of course be understood that the rear bumper of the automobile may be made to co-operate with the rear axle in a similar manner.

Various modifications may be made in my invention without departing from the spirit thereof or the scope of the claims and therefore the exact forms shown are to be taken as illustrative only and not in a limiting sense, and I desire therefore, that only such limitations shall be placed thereon as are imposed by the prior art or are specifically set forth in the appended claims.

What I claim as my invention is:

1. In an automobile, the combination with the chassis frame, the axle and a resilient bumper, of means connecting the axle and the bumper, and supported intermediately upon the frame.

2. In an automobile, the combination with the chassis frame, the axle and a resilient bumper, of flexible means connecting the axle and the bumper, and supported intermediately upon the frame.

3. In an automobile, the combination with the chassis frame, the axle and a resilient bumper, of a supporting element on the frame above the axle, and means connecting the axle and the bumper and supported intermediately upon the aforesaid supporting element.

4. In an automobile, the combination with the chassis frame, the axle and a resilient bumper, of a supporting element on the frame above the axle, and flexible means connecting the axle and the bumper and supported intermediately upon the aforesaid supporting element.

5. In an automobile, the combination with the chassis frame, the axle and a resilient bumper, of a bracket mounted upon the bumper, a connecting element having one end secured to said bracket and the other end connected to the axle, and a supporting element on the frame above the axle for supporting said connecting element intermediately of its length.

6. In an automobile, the combination with the chassis frame, the axle and a resilient bumper, of a bracket mounted upon the bumper, a flexible connecting element having one end secured to said bracket and the other end connected to the axle, and a supporting element on the frame above the axle for supporting said connecting element intermediately of its length.

7. In an automobile, the combination with the chassis frame, the axle and a resilient bumper, of a bracket mounted upon the bumper, a cable connecting said bracket and axle, and a support on the frame above the axle over which the cable freely passes.

8. In an automobile, the combination with the chassis frame, the axle and a resilient bumper, of a support on the frame above the axle, and a cable connecting the bumper and the axle and freely passing over the aforesaid support.

9. In an automobile, the combination with the chassis frame, the axle and a resilient bumper, of a roller mounted upon the frame above the axle, and a cable connecting the bumper and axle and passing over said roller.

10. In an automobile, the combination with the chassis frame, the axle and a resilient bumper disposed transversely of the chassis, of a supporting element on the frame at each side thereof, means connecting the axle adjacent to each end thereof to the corresponding end of the bumper and supported intermediately upon the corresponding supporting element.

11. In an automobile, the combination with the chassis frame, the axle and a resilient bumper disposed transversely of the chassis, of a bracket mounted upon the bumper adjacent to each end thereof, a connecting element connecting each bracket to the corresponding end of the axle, and a supporting element at each side of the frame above the axle for supporting the corresponding connecting element intermediately of its length.

TRUMAN MORSE NORTON.

Witnesses:
JOHN G. HAYWARD,
JEAN SPARKS.